United States Patent
Riou et al.

(10) Patent No.: US 10,662,876 B2
(45) Date of Patent: May 26, 2020

(54) TURBOMACHINE VANE COMPRISING AN ELECTROACOUSTIC SOURCE WITH IMPROVED ASSEMBLY MODE, ROW OF OUTLET GUIDE VANES AND TURBOMACHINE COMPRISING SUCH A VANE

(71) Applicant: SAFRAN AIRCRAFT ENGINES, Paris (FR)

(72) Inventors: Georges Jean Xavier Riou, Melun (FR); Jacky Novi Mardjono, Nogent sur Marne (FR); Norman Bruno Andre Jodet, Maisons Alfort (FR); Jeremy Paul Francisco Gonzalez, La Chapelle Rablais (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 260 days.

(21) Appl. No.: 16/025,582

(22) Filed: Jul. 2, 2018

(65) Prior Publication Data
US 2019/0017439 A1    Jan. 17, 2019

(30) Foreign Application Priority Data
Jul. 7, 2017   (FR) ...................................... 17 56473

(51) Int. Cl.
*F04D 29/66* (2006.01)
*F02C 7/045* (2006.01)
(Continued)

(52) U.S. Cl.
CPC .............. *F02C 7/045* (2013.01); *B64D 33/02* (2013.01); *F01D 9/041* (2013.01); *F04D 29/542* (2013.01);
(Continued)

(58) Field of Classification Search
CPC ......... F02C 7/045; F01D 9/041; B64D 33/02; B64D 2033/0206; F05D 2260/962;
(Continued)

(56) References Cited

U.S. PATENT DOCUMENTS

| 5,420,383 A | 5/1995 | Kousen et al. |
| 2013/0092471 A1* | 4/2013 | Kruger ................ F01N 13/1888 181/252 |
| 2016/0146039 A1 | 5/2016 | Braden et al. |

FOREIGN PATENT DOCUMENTS

| FR | 2 968 048 A1 | 6/2012 |
| FR | 2968048 A1 * | 6/2012 ........... F04D 29/665 |

OTHER PUBLICATIONS

French Preliminary Search Report dated Feb. 28, 2018 in French Application 17 56473 filed on Jul. 7, 2017(with English Translation of Categories of Cited Documents).
(Continued)

*Primary Examiner* — Eldon T Brockman
(74) *Attorney, Agent, or Firm* — Oblon, McClelland, Maier & Neustadt, L.L.P.

(57) ABSTRACT

A turbomachine vane includes an electroacoustic source including two membranes fixed on a support arranged such that the membranes and the support delimit a first cavity. The membranes are arranged on two opposite sides of the first cavity between the two aerodynamic surfaces of the vane. A first of the aerodynamic surfaces includes a first region arranged facing a first of the membranes for the passage of acoustic waves. The membranes and membrane vibration device are configured such that the membranes vibrate in phase opposition and along a same emission direction by applying forces to the support such that the resultant force is approximately zero. The mechanical energy lost in the form of vane deformations due to membrane vibrations can thus be minimized.

11 Claims, 2 Drawing Sheets

(51) Int. Cl.
  *F04D 29/54* (2006.01)
  *B64D 33/02* (2006.01)
  *F01D 9/04* (2006.01)

(52) U.S. Cl.
  CPC .... *F04D 29/665* (2013.01); *B64D 2033/0206* (2013.01); *F05D 2220/36* (2013.01); *F05D 2260/962* (2013.01); *F05D 2260/963* (2013.01)

(58) Field of Classification Search
  CPC .......... F05D 2220/36; F05D 2260/963; F04D 29/665; F04D 29/542
  See application file for complete search history.

(56) References Cited

OTHER PUBLICATIONS

Zillmann, J. et al. "Active Control of Fan Noise by Active Stators" Internoise 2001: The 2001 International Congress and Exhibition on Noise Control Engineering, Aug. 2001, pp. 11.

Genoulaz, N. et al. "Experimental Validation of an Active Stator Technology Reducing Modern Turbofan Engine Noise", 13th AIAA/CEAS Aeroacoustics Conference, AIAA 2007-3688, American Institute of Aeronautics and Astronautics, May 21, 2007, pp. 18.

Vinogradov, I. et al. "Active control of rotor-Stator Interaction Noise Using Stator-Mounted Actuators", AIAA Journal, The American Istitute of Aeronautics ANS Astronautics, vol. 53, No. 1, Jan. 2015, pp. 11.

\* cited by examiner

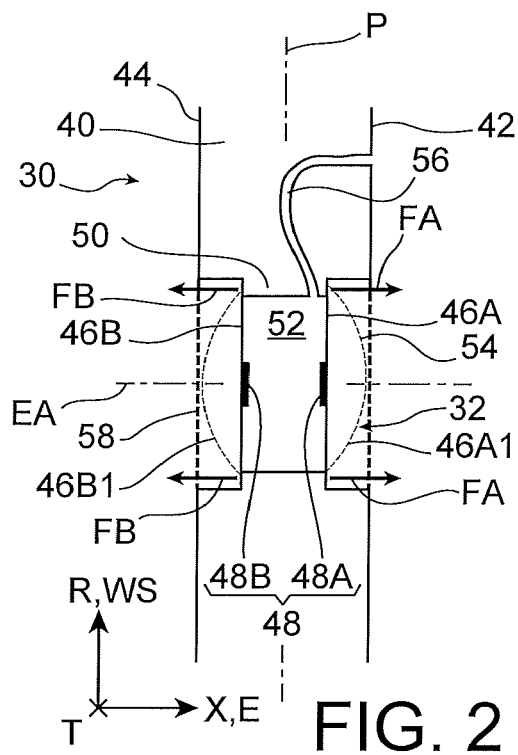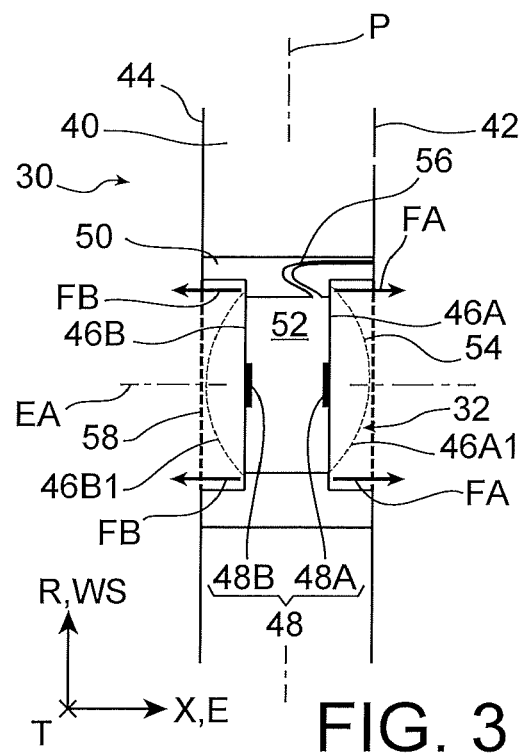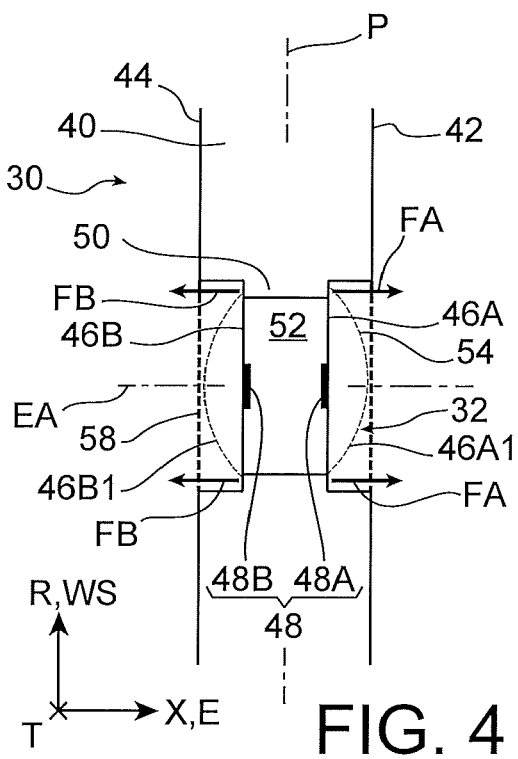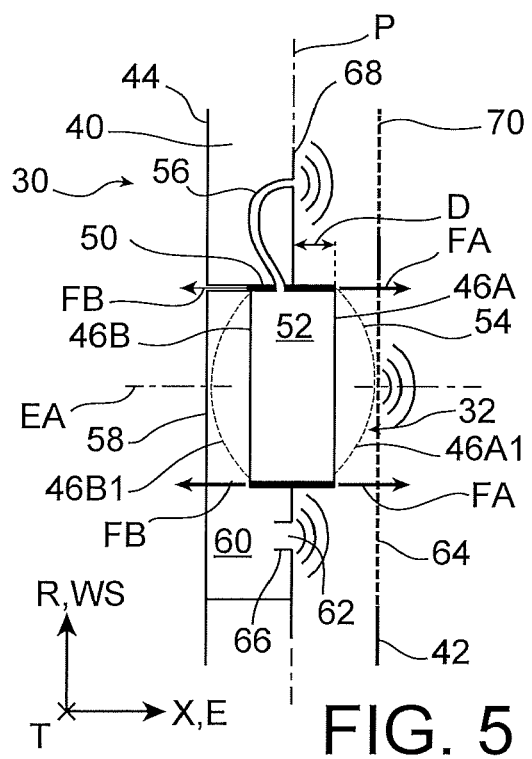

TURBOMACHINE VANE COMPRISING AN ELECTROACOUSTIC SOURCE WITH IMPROVED ASSEMBLY MODE, ROW OF OUTLET GUIDE VANES AND TURBOMACHINE COMPRISING SUCH A VANE

TECHNICAL DOMAIN

This invention relates to the domain of turbomachine vanes, particularly for aircraft turbomachines.

The invention relates in general to a vane comprising an electroacoustic source designed to reduce noise caused by rotation of blinks in aircraft turbomachines.

In some preferred embodiments, the invention is intended particularly to reduce noise caused by fans in twin-spool turbomachines, and particularly spike noise at partial load caused by the interaction between wake from these fans and outlet guide vanes (OGV) downstream from these fans. These outlet guide vanes are affected by the impact of an air flow that periodically reduces velocity, which induces a periodic variation to the load applied on these outlet guide vanes, this periodic load variation being the cause of the above-mentioned spike noise.

STATE OF PRIOR ART

It has been proposed that noise caused by fans can be reduced by introducing an electroacoustic source controlled so as to generate sound waves in phase opposition to the above-mentioned noise, into stator vanes located downstream from the fans.

Documents [1] to [3] listed at the end of this description show different examples of implementations of this technique.

In order to save energy, the inventors fixed themselves the objective of optimising the energy efficiency of this type of technique.

PRESENTATION OF THE INVENTION

The invention discloses a vane for a turbomachine comprising a body forming two aerodynamic surfaces, namely an intrados surface and an extrados surface, and an electroacoustic source. The electroacoustic source comprises two membranes fixed on a support fixed to the body or forming part of the body, and means of vibrating these membranes. The support and the membranes jointly delimit a first cavity inside the body, such that the membranes are arranged on two opposite sides of the first cavity.

According to the invention, the membranes are arranged between the two aerodynamic surfaces. Furthermore, a first aerodynamic surface among the two aerodynamic surfaces comprises a first region arranged facing a first membrane among the membranes and allowing the passage of acoustic waves. Finally, the membranes and the membrane vibration means are configured such that the membranes vibrate in phase opposition and along a same emission direction by applying forces to the support such that the resultant force is approximately zero.

In general, the invention thus arranges matters such that forces applied to the support locally by the membranes, in reaction to vibration movements of the membranes, are compensated within the support such that no resultant of these forces is transmitted to other parts of the vane. Thus, a maximum part of the mechanical energy supplied to the membranes by the membrane vibration means is actually used to vibrate the membranes, while mechanical energy lost in the form of deformations of the vane body can be minimised.

According to other advantageous aspects of the invention, the method comprises one or several of the following characteristics, taken in isolation or in any technically possible combination:

a second aerodynamic surface among the two aerodynamic surfaces comprises a second region arranged facing a second membrane among the membranes and allowing the passage of acoustic waves.

a second membrane among the membranes, and at least one among the body and the support, jointly delimit a second cavity separated from the first cavity, the second cavity opening up through at least one opening on the side of the first aerodynamic surface, and the second cavity being closed on the opposite side;

the membranes are similar, and the membrane vibration means are configured such that the amplitudes of the membrane vibrations are the same;

the membranes are symmetric with each other about a plane of symmetry orthogonal to the emission direction;

the first cavity is approximately symmetrical about the plane of symmetry;

the first cavity is connected to a pressure balancing conduit;

the first cavity is closed.

The invention also relates to an annular row of outlet guide vanes for a turbomachine, comprising at least one vane of the type described above.

The invention also relates to a turbomachine comprising at least one vane of the type described above or an annular row of outlet guide vanes of the type described above.

BRIEF DESCRIPTION OF THE DRAWINGS

The invention will be better understood and other details, advantages and characteristics of it will become clear after reading the following description given as a non-limitative example with reference to the appended drawings in which:

FIG. 2 is a partial diagrammatic sectional view of an outlet guide vane according to a first preferred embodiment of the invention, forming part of the turbomachine in FIG. 1;

FIGS. 3 to 5 are views similar to FIG. 2, each illustrating outlet guide vanes according to other preferred embodiments of the invention.

In all these figures, identical numeric references may denote identical or similar elements.

DETAILED PRESENTATION OF PREFERRED EMBODIMENTS

Figure 1:
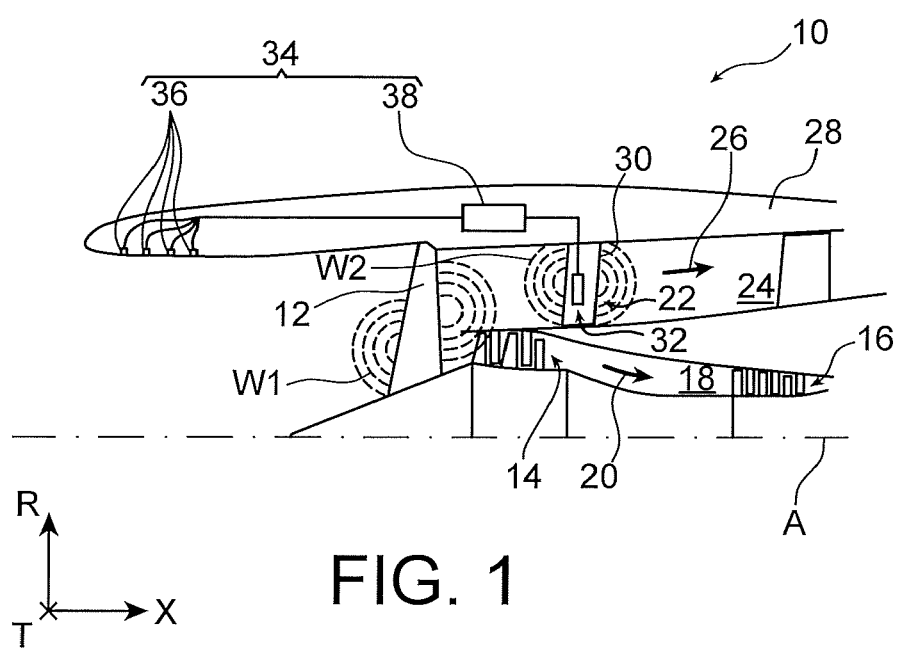
FIG. 1 is a partial diagrammatic axial sectional half-view of a twin-spool turbomachine for an aircraft.

FIG. 1 illustrates a part of aircraft twin-spool turbomachine 10 comprising particularly a fan 12, a low pressure compressor 14 and a high pressure compressor 16 arranged in a space 18 carrying a core flow 20 of the turbomachine, and an annular row 22 of outlet guide vanes extending through a space 24 carrying a bypass flow 26 of the turbomachine delimited at the exterior by a nacelle 28 of this turbomachine.

Throughout this description, the axial direction X is the direction of a longitudinal axis A of the turbomachine corresponding to an axis of rotation of the turbomachine rotors, the radial direction R is a direction orthogonal to the axial direction X at all points and intersecting the X direction, and the tangential direction T is orthogonal to the above two directions at all points. Furthermore, the "upstream" and "downstream" directions are defined with reference to the general flow of gases in the turbomachine.

The annular row 22 of outlet guide vanes comprises a set of vanes, at least some of these vanes incorporating an electroacoustic source 32.

In a manner known in itself, the turbomachine comprises control means 34 to control the electroacoustic 32 sources of each of the outlet guide vanes, said means being configured so as to minimise a magnitude measured by one, or preferably several, acoustic sensors 36.

The magnitude minimised by the control means 34 can be the global sound intensity or the sound intensity measured in a predetermined frequency band, for example in a frequency band centred on the rotation frequency of the turbomachine fan 12.

The control means 34 may for example be housed in the nacelle 28, and comprise an electronic unit 38 designed to receive information from acoustic sensors 36 and to use an algorithm for controlling the electroacoustic source 32 of each vane 30, according to the principle of a feedback loop.

The acoustic sensors 36 are advantageously integrated into the nacelle 28, for example close to its upstream end, in other words at the turbomachine intake duct, to enable a measurement of noise emitted in the upstream direction by the fan 12. As a variant, some or all of the acoustic sensors 36 can be arranged at a secondary nozzle of the turbomachine (not visible on FIG. 1) to enable a measurement of noise emitted in the downstream direction by the fan 12.

During operation, interaction between the wake generated by the blades of the rotating fan 12 and vanes in the annular row 22 of outlet guide vanes can be the source of emitted sound waves W1 propagating in the upstream and downstream directions from the blades of the fan 12.

The electroacoustic source 32 of each vane 30 in the annular row 22 of outlet guide vanes is controlled to generate sound waves W2 so as to induce destructive interference with sound waves W1 originating from the fan 12, so as to minimise the sound intensity measured by the acoustic sensors 36.

FIG. 2 illustrates part of a vane 30 according to a first embodiment of the invention in more detail, this vane 30 being intended to form part of the annular row 22 of outlet guide vanes of the turbomachine 10 in FIG. 1. FIGS. 3-5 illustrate the vanes 30 of other preferred embodiments of the invention, as will become clearer in the following.

On FIGS. 2-5, the axial direction X corresponds to the direction of the longitudinal axis A of the turbomachine 10 when the vane 30 is integrated into the annular row 22 of outlet guide vanes within the turbomachine 10. Under the same conditions, the direction from the root (not shown) of the vane 30 towards the tip of the vane (not shown), called the wingspan direction WS of the vane, coincides with the radial direction R.

The vane 30 comprises a body 40 forming two aerodynamic surfaces, the intrados 42 and extrados 44 surfaces respectively, and comprises the above-mentioned electroacoustic source 32.

The electroacoustic source 32 comprises two membranes 46A, 46B and membrane vibration means 48.

The membranes 46A, 46B are fixed to a support 50. In the embodiment in FIG. 2, and in the embodiments in FIGS. 4 and 5, the support 50 is composed of a part of the body 40.

As a variant, the support 50 may be an element distinct from the body 40, and installed in an opening of the body, for example by embedment as shown on FIG. 3.

The vibration means 48 are composed for example of two piezoelectric plates 48A, 48B applied to central regions of the two membranes 46A, 46B respectively so as to form two bimetallic assemblies. In such an assembly, an elongation of the piezoelectric plate induces a deformation of the membrane, in a well-known manner. On FIGS. 2-5, the membranes 46A, 46B are thus represented in a rest conformation in continuous lines, and in an elongated configuration in discontinuous lines references 46A1 and 46B1 respectively.

The membranes 46A, 46B are fixed to the support 50 by their corresponding peripheries.

The support 50 and the membranes 46A, 46B jointly delimit a first cavity 52 inside the body 40, such that the membranes 46A, 46B are arranged on two opposite sides of the first cavity 52.

According to the most general principle of the invention, the membranes 46A, 46B are arranged between the two aerodynamic surfaces 42 and 44.

Furthermore, a first aerodynamic surface among the two aerodynamic surfaces, for example the intrados surface 42, comprises a first region 54 arranged facing a first membrane 46A among the membranes and allowing the passage of acoustic waves.

Finally, the membranes 46A, 46B and the membrane vibration means 48 are configured such that the membranes vibrate in phase opposition and along a same emission direction E (preferably parallel to the axial direction X) by applying forces to the support 50 such that the resultant of the forces FA, FB is approximately zero. "Phase opposition" means that when one of the membranes is moving in one direction, for example towards the left on the figures, the other membrane moves in the other direction, for example towards the right in the figures.

This latter characteristic is made possible particularly by the fact that the membranes 46A, 46B are laid out between the two aerodynamic surfaces 42 and 44, such that the shapes and orientations of the membranes 46A, 46B respectively are not imposed by the shapes of the aerodynamic surfaces 42 and 44 respectively.

In general, the invention thus arranges matters such that forces applied to the support 50 locally by the membranes 46A, 46B, in reaction to vibration movements of the membranes, are compensated within the support 50, which is either a part of the body 40 relatively close to the membranes 46A, 46B, or an element distinct from the body. Thus, no resultant of these forces is transmitted to the remaining part of the body 40 or to the entire body, depending on the case. Consequently, a maximum proportion of the mechanical energy output to the membranes 46A, 46B by the vibration means 48 is effectively used to vibrate the membranes, while mechanical energy lost in the form of deformations of the body 40 is minimised.

To achieve such a result, it is advantageous if the membranes 46A, 46B are similar, and the means of vibrating the membranes 46A, 46B are configured such that the amplitudes of membrane vibrations are the same.

Nevertheless, other configurations are possible so as to cancel out the resultant force of forces FA and FB.

For example, one of the membranes may be smaller than the other membrane but have a larger surface area than the other membrane such that its mass is globally the same as the mass of the other membrane.

As a variant, the mass of one of the membranes may be smaller than the mass of the other membrane, but its vibration amplitude may be larger than that of the other membrane.

In all cases, the resultant of the forces FA and FB is cancelled out when the product of the mass and the acceleration of one of the membranes (integrated on the surface of the membrane) is equal to the product of the mass and the acceleration of the other membrane (also integrated on the surface of this other membrane).

Furthermore, the membranes 46A, 46B are preferably symmetric with each other about a plane of symmetry P orthogonal to the emission direction E, as shown on FIGS. 2-5

Consequently, the membranes 46A, 46B are centred on the same emission axis EA, which also has also an additional advantage of minimising the moment resultant of forces FA and FB. The reduction in the mechanical energy dissipated by deformation of the body 40 of the blade is thus optimal.

Furthermore, the first cavity 52 is preferably approximately symmetrical about the plane of symmetry P, as can also be seen on FIGS. 2-5.

This latter symmetry characteristic optimally simplifies force paths between the membranes 46A, 46B and the support 50.

In the embodiments in FIGS. 2, 3 and 5, the first cavity 52 is connected to a pressure balancing duct 56 that for example opens up in the intrados surface 42.

The pressure balancing duct 56 can balance the internal pressure in the first cavity 52 with the pressure in the environment outside the vane 30, such that the deformation of the membranes 46A, 46B is not disturbed by the pressure inside the first cavity 52.

Thus, the pressure balancing duct 56 can in general simplify control of membrane vibration means 48.

As a variant, the first cavity can be closed as shown on FIG. 4.

It should be noted that the concept of a first cavity being "approximately symmetrical" about the plane of symmetry means that the first cavity 52 is symmetric about the plane of symmetry P, ignoring the connection of the cavity to the pressure balancing duct 56, if applicable.

In the embodiments in FIGS. 2-4, a second aerodynamic surface among the two aerodynamic surfaces, for example the extrados surface 44, comprises a second region 58 arranged facing a second membrane 46B among the membranes and allowing the passage of acoustic waves.

Acoustic waves generated by the two membranes are thus transmitted through the two aerodynamic surfaces 42 and 44 respectively, propagating outside the vane in opposite directions.

On the other hand, in the embodiment shown on FIG. 5, the body 44, the support 50, and a second membrane 46B among the two membranes mentioned above, jointly delimit a second cavity 60 separated from the first cavity 52. The second cavity 60 opens up through an opening 62 on the side of the first aerodynamic surface or intrados surface 42, in other words on the same side as the first membrane 46A. Furthermore, the second cavity 60 is closed on the opposite side, namely on the side of the extrados surface 44.

Thus, instead of the acoustic wave emitted by the second membrane 46B propagating outside the vane in a direction opposite the propagation direction of the wave emitted by the first membrane 46A, the acoustic wave emitted by the second membrane 46B propagates inside the second cavity 60 so as to be reflected towards the first aerodynamic surface or intrados surface 42, passing through the opening 62. The acoustic wave emitted by the second membrane 46B then interferes constructively with the acoustic wave emitted by the first membrane 46A, provided that there is an appropriate phase shift between the opening 62 and the first membrane, and appropriate sizing of the second cavity 60. Such a phase shift is materialised on FIG. 5 by the offset D between the opening 62 and the first membrane 46A along the emission direction E.

In this case, the first aerodynamic surface or intrados surface includes a third region 64 located facing the opening 62 and allowing the passage of acoustic waves. The third region 64 and the first region 54 can be contiguous, as shown on FIG. 5.

As a variant, and depending on the respective shapes of the support 50, the body 40 and the second cavity 60, the second cavity can be entirely delimited by the second membrane 46B and the body 40, or by the second membrane 46B and the support 50.

Furthermore, the acoustic efficiency of the second membrane 46B can be optimised by forming the opening 62 at the end of a throat 66 sized to form a Helmholtz resonator.

Moreover, regardless of the configuration (through or not through) of the electroacoustic source 32, the pressure fluctuation that occurs inside the first cavity 52 can be used to produce an additional acoustic source at the outlet from the pressure balancing duct 56 by appropriately sizing this duct so that it forms a Helmholtz resonator, as shown diagrammatically on FIG. 5.

In this case, the pressure balancing duct 56 can open up through an internal wall 68 of the vane, at a distance from the corresponding aerodynamic surface 42, in which case the latter comprises another region 70 formed facing the outlet from the pressure balancing duct 56 through which acoustic waves can pass.

In the example illustrated, optionally, the internal wall 68 has the same offset D relative to the first membrane 46A, along the emission direction E, as the opening 62 mentioned above.

Other variants are possible without going outside the framework of the invention defined by the appended claims, particularly any technically feasible combination of characteristics of the embodiments in FIGS. 2-5.

For example, the vane in the non-through configuration in FIG. 5 may not have a pressure balancing duct and/or may be provided with a support separate from the body 40 of the vane.

In general, each of the regions configured to allow the passage of acoustic waves may for example consist of an opening formed in the corresponding aerodynamic surface of the vane, this opening preferably being covered by a woven fabric or a wall containing microperforations.

BIBLIOGRAPHY

[1]: ZILLMANN J ET AL. "Active Control of Fan Noise by Active Stators" *INTERNOISE 2001: THE 2001 INTERNATIONAL CONGRESS AND EXHIBITION ON NOISE CONTROL ENGINEERING*, Aug. 27, 2001 (2001-08-27), pages 701-706, XP008139301, The Hague;

[2]: GENOULAZ N ET AL: "Experimental Validation of an Active Stator Technology Reducing Turbofan Engine Noise", 13$^{th}$ AIAA/CEAS AEROACOUSTICS CONFERENCE, AIAA 2007-3688, AMERICAN INSTITUTE OF AERONAUTICS AND ASTRONAUTICS, May 21, 2007 (2007-05-21), pages 1-18, XP008139275, RESTON, Va. ISBN: 978-1-56347-883-3

[3]: Patent application FR 2 968 048 A1

The invention claimed is:

1. A vane for a turbomachine comprising:
a body forming two aerodynamic surfaces which are an intrados surface and an extrados surface; and
an electroacoustic source,
wherein the electroacoustic source comprises two membranes fixed on a support fixed to the body or forming part of the body, and a vibrating device which vibrates the membranes,
wherein the support and the membranes jointly delimit a first cavity inside the body, the membranes being arranged on two opposite sides of the first cavity,
wherein the membranes are arranged between the two aerodynamic surfaces, a first aerodynamic surface among the two aerodynamic surfaces comprises a first region arranged facing a first membrane among the membranes and allowing passage of acoustic waves, and
wherein the membranes and the vibrating device are configured such that the membranes vibrate in phase opposition and along a same emission direction, by applying forces to the support such that a resultant force of said forces is approximately zero.

2. The vane according to claim 1, wherein a second aerodynamic surface among the two aerodynamic surfaces comprises a second region arranged facing a second membrane among the membranes and allowing the passage of acoustic waves.

3. The vane according to claim 1, wherein a second membrane among the membranes, and at least one of the body and the support, jointly delimit a second cavity separated from the first cavity, the second cavity opening up through at least one opening on the side of the first aerodynamic surface, and the second cavity being closed on the opposite side.

4. The vane according to claim 1, wherein the membranes are similar, and the vibrating device is configured such that amplitudes of membrane vibrations are the same.

5. The vane according to claim 4, wherein the membranes are symmetric with each other about a plane of symmetry orthogonal to the emission direction.

6. The vane according to claim 5, wherein the first cavity is approximately symmetrical about the plane of symmetry.

7. The vane according to claim 1, wherein the first cavity is connected to a pressure balancing duct.

8. The vane according to claim 1, wherein the first cavity is closed.

9. An annular row of outlet guide vanes for a turbomachine, comprising at least one vane according to claim 1.

10. A turbomachine, comprising at least one vane according to claim 1.

11. The vane according to claim 1, wherein the emission direction is parallel to an axial direction.

* * * * *